United States Patent [19]

Adams et al.

[11] 4,418,936

[45] Dec. 6, 1983

[54] TOW BAR HEAD FOR AIRCRAFT

[76] Inventors: Kenneth E. Adams, 11021 SW. 44th St.; Bertram C. Adams, 11370 SW. 60th Ter., both of Miami, Fla. 33165

[21] Appl. No.: 383,240

[22] Filed: May 28, 1982

[51] Int. Cl.³ .............................................. B60D 1/14
[52] U.S. Cl. ................................. 280/493; 244/50; 280/504
[58] Field of Search ............... 280/504, 508, 510, 481, 280/493, 476 R; 180/14 C; 244/3, 50

[56] References Cited

U.S. PATENT DOCUMENTS 2,400,836  5/1946  McElhinney ....................... 280/504
3,709,522  1/1973  Olson ................................ 180/14 C Primary Examiner—Joseph F. Peters, Jr.
Assistant Examiner—D. Lynn Fugate
Attorney, Agent, or Firm—Ernest H. Schmidt

[57] ABSTRACT

A tow bar coupling head removably attachable to the cross pin of an aircraft nose wheel strut has a solid metal body portion with a transverse slot in its underside within which the cross pin is received. A positive deadbolt slide lock retains the cross pin in place. A removable locking pin extending vertically through the body portion prevents accidental withdrawal of the deadbolt slide lock.

7 Claims, 12 Drawing Figures

U.S. Patent   Dec. 6, 1983   4,418,936
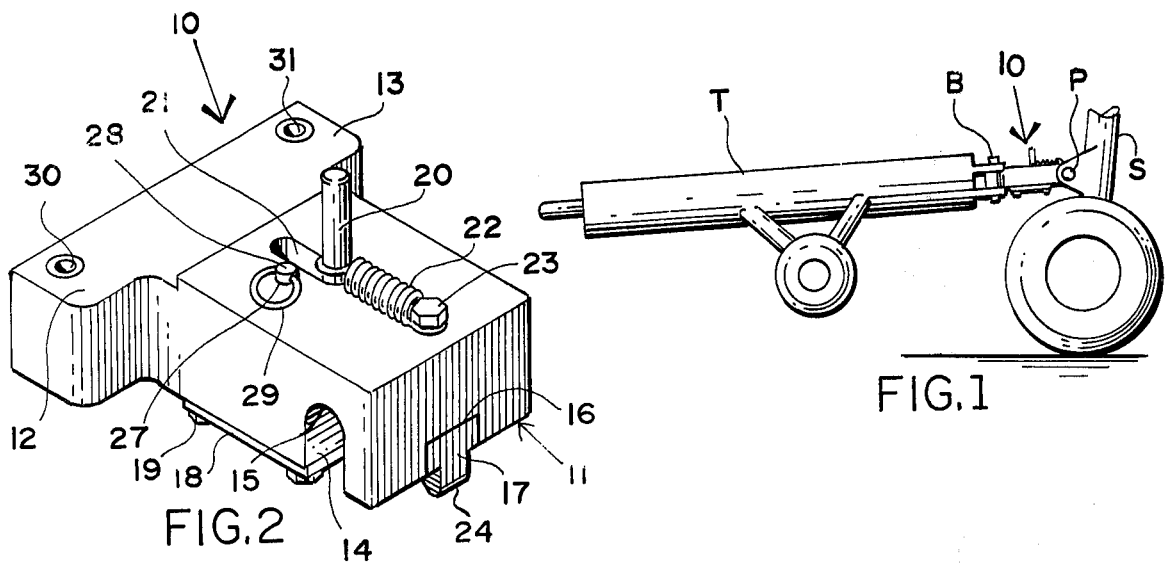
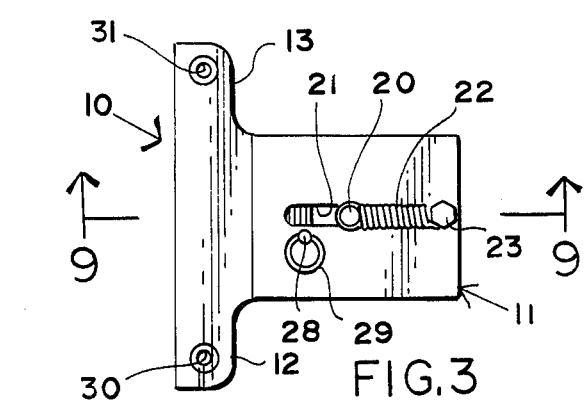
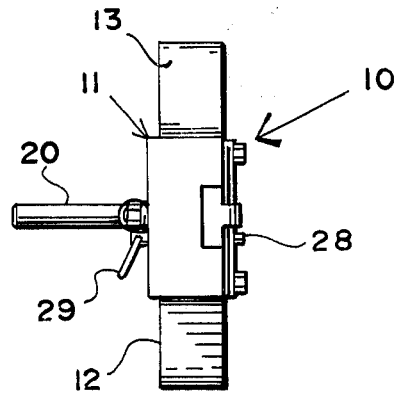
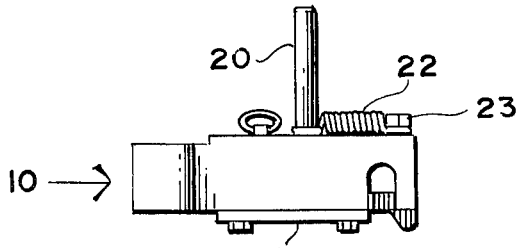
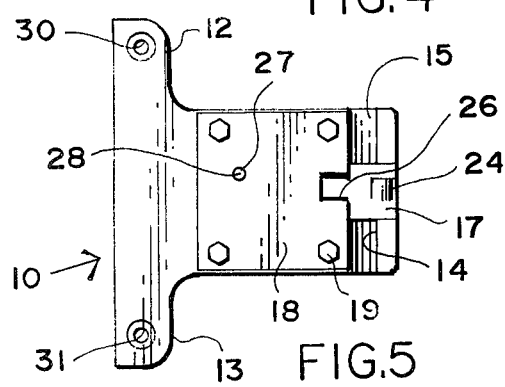
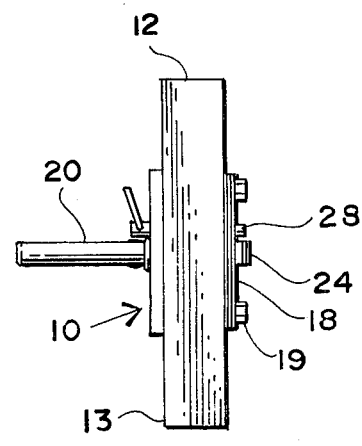

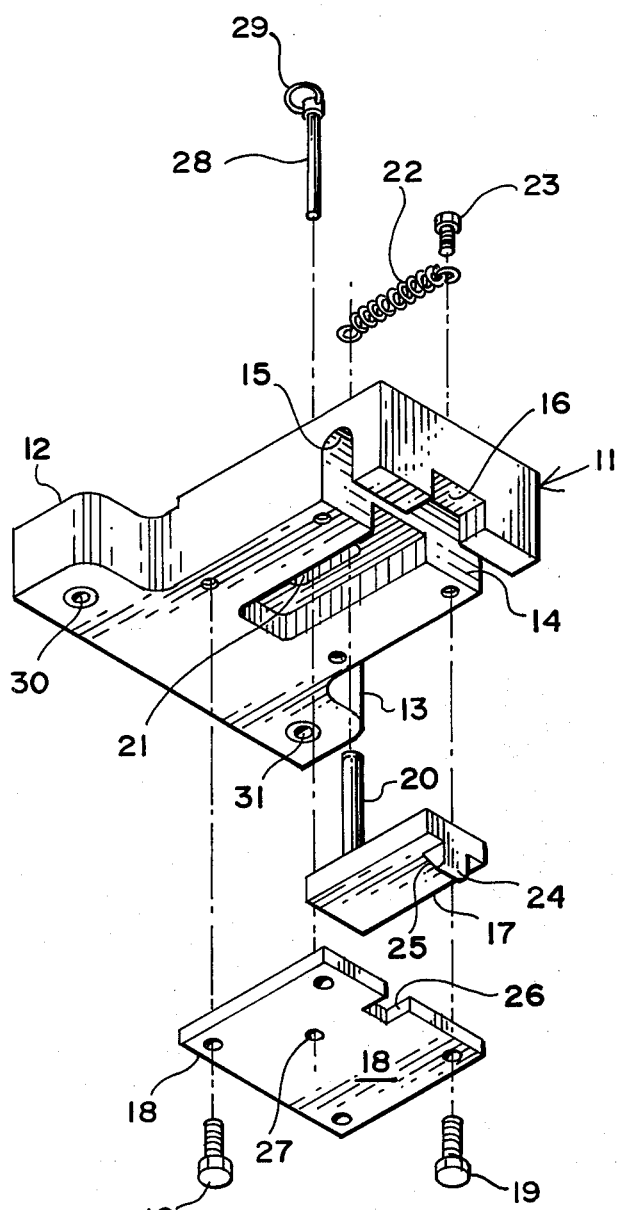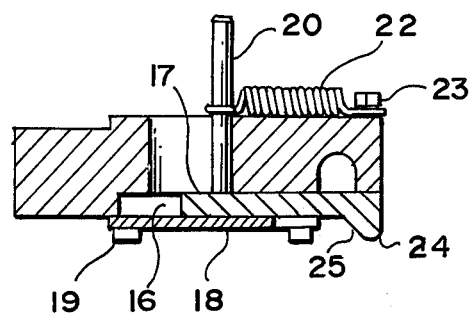
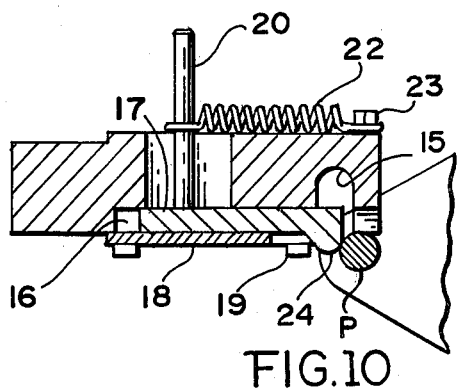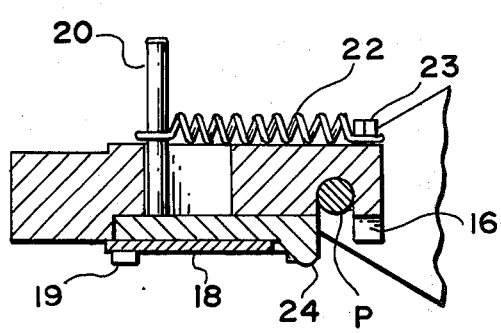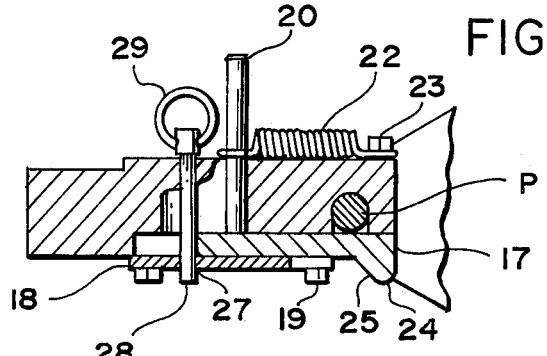

TOW BAR HEAD FOR AIRCRAFT

BACKGROUND OF THE INVENTION

This invention relates to commercial aircraft and is directed particularly to improvements in tow bar coupling devices of the type removably attachable to the towing cross pin provided on the aircraft nose wheel strut.

It is common practice to move commercial aircraft along the ground for docking, maintenance purposes, etc. with use of a tractor pulling a tow bar the outer end of which has a tow bar head for coupling to the aircraft strut cross pin. Such tow bar heads heretofore provided for this purpose have utilized a pivotally journalled hook operative to hookingly engage the strut cross pin in a recess provided at the forward end of a tow bar head. These have been found to be deficient in various respects, principally in that the towing stress, because of the recess within the head body to accommodate the hook member, substantially reduces the area of surface contact between the coupling cross pin and the tow bar head, thereby correspondingly reducing the towing strength of the tow bar head.

SUMMARY OF THE INVENTION

It is, accordingly, the principal object of this invention to provide a novel and improved tow bar head of the character described wherein there is full abutting contact between the aircraft cross pin and the body portion of the tow bar head, thereby providing for maximum coupling strength for a given size of the body portion of the coupling head.

Another object of the invention is to provide improved coupling head of the above nature including a sliding deadbolt and deadbolt locking device for securely locking the tow bar head in place without possibility of inadvertent release or uncoupling during a towing operation.

Yet another object of the invention is to provide a tow bar head for aircraft which will be simple in construction, easy to install and operate, dependable in performance, and efficient in operation.

Other objects, features and advantages of the invention will be apparent in the following description when read with reference to the accompanying drawings.

BRIEF DESCRIPTION OF THE DRAWINGS

In the drawings, wherein like reference numerals denote corresponding parts in each of the several views:

FIG. 1 is a side elevational view of a tow bar equipped with a tow bar head embodying the invention, the tow bar head being shown as attached to the cross pin of the nose wheel strut of an aircraft (partially illustrated);

FIG. 2 is an oblique view of the tow bar head, shown separately and as viewed from above;

FIG. 3 is a top view of the tow bar head, shown separately;

FIG. 4 is a side elevational view thereof;

FIG. 5 is a bottom plan view thereof;

FIG. 6 is a front elevational view thereof;

FIG. 7 is a rear elevational view thereof;

FIG. 8 is an oblique, "exploded" view thereof as viewed from underneath;

FIG. 9 is a longitudinal cross-sectional view of the tow bar head taken along the line indicated at 9—9 of FIG. 3;

FIGS. 10, 11 and 12 are longitudinal cross-sectional views similar to FIG. 9 but illustrating in sequence how the locking bar slides between open and closed positions for capturing and locking in place an aircraft nose wheel strut cross pin.

Referring now in detail to the drawings, reference numeral 10 designates, generally, a preferred form of tow bar head embodying the invention. In FIG. 1 the tow bar head 10 is illustrated in use, being connected between an ordinary tow bar T and a cross pin P attached to the nose wheel strut S of an aircraft to be towed. It will be understood that a tractor (not illustrated) will ordinarily be coupled to the outer end of the tow bar T to tow the aircraft from place-to-place along the ground.

With reference now to FIGS. 2 through 8, the tow bar head 10, which will preferably be fabricated of hardened steel for strength and durability in use, comprises, generally, a solid steel body member 11 of generally T-shaped configuration to define, at the rear end thereof, a pair of opposed, laterally-outwardly extending tow bar connector portions 12, 13. As best illustrated in FIGS. 2, 4, 5 and 8, the underside of the tow bar head body member 11 is provided, in spaced relation from its forward end, with a transverse slot 14, the bottom of which is circularly rounded, to define a hemicylindrical surface 15. The width of the transverse slot 14 will be substantially the same or slightly larger than the diameter of the cross pin P of an aircraft to be towed, as is hereinafter more particularly described. The underside of the tow bar head body member 11 is also formed with a longitudinally-extending, central, rectangular recess 16, open at the forward end of said body member but extending somewhat short of the rearward end thereof. A substantially rectangular slide lock 17 is slidingly received within the rectangular recess 16, and retained in place by a cover plate 18 secured against the underside of the tow bar head body member 11 as by machine screws 19. It is to be noted that the forward edge of the cover plate 18, upon assembly, lies along the rearward edge of the transverse slot 14 so as not to obstruct entry and withdrawal of an aircraft cross pin in the manner and for the purpose hereinafter more particularly described.

Means is provided for manually controlling the sliding movement of the slide lock 17 in its rectangular recess 16. To this end, the slide lock 17 has welded or otherwise securely attached to its upper surface a vertically-upwardly-extending cylindrical handle 20, which passes through a central, longitudinally-extending slot 21 in the tow bar head body member 11 and extends upwardly thereof for use as a handle. A helical tension spring 22 adjacent the top of the tow bar head body member 11 has one end attached to the cylindrical handle 20 and its other end secured with respect to said body member as by a machine screw 23, and yieldingly constrains said cylindrical handle in its forward-most, abutting position within the slot 21. When in such position, the associated slide lock 17 is in its forward-most position within its rectangular recess 16, and the forward end of said slide lock will be substantially flush with the front surface of the tow bar head body member 11 (see FIG. 9). The lengths of the slot 21 and the slide lock recess 16 are such that, when the cylindrical handle 20 is pulled fully to the rear against the forward urging of the tension spring 22, the forward end of the slide lock 17 will be flush with the rear wall surface of the transverse slot 14 in the tow bar head body member 11.

The slide lock 17 is also provided, at the underside, with a central, downwardly-projecting striker nose portion 24, the front surface of which is flush with the front end surface of said slide lock, and the rear surface of which is rearwardly inclined to provide a beveled striker surface 25, for the purpose hereinafter appearing. As best illustrated in FIGS. 2 and 8, the cover plate 18 is provided along the front with a central rectangular recess 26 to receive the striker nose portion 24 when the slide lock 17 is manually withdrawn to its rearward-most position in the tow bar head body member 11.

Means is also provided for locking the slide lock 17 in its forward-most or locking position, as is best illustrated in FIGS. 2 through 6 and 12. To this end, a cylindrical opening 27 extends from top to bottom through the body member 11 of the tow bar head and the cover plate 18 for the reception of a locking pin 28. As best illustrated in FIGS. 4, 5 and 12, the locking pin opening 27 passes just behind the rearward-most end of the slide lock 17 when in locking position, so that when said pin is inserted it blocks and prevents rearward movement of said slide lock to its unlocking position. A gripping ring 29 attached to the upper end of locking pin 28 facilitates its insertion and withdrawal.

The tow bar connector portions 12, 13 of the tow bar head 10 are provided with vertically-extending, through bolt holes 30, 31 for the reception of shear bolts B (only one illustrated in FIG. 1) by means of which said tow bar head is releasably attached to the yoke at the forward end of the tow bar T (see FIG. 1).

Referring now to FIGS. 9 through 12, and considering the operation of the tow bar head in its attachment to and release from the cross pin P of an aircraft nose wheel strut, FIG. 9 illustrates the tow bar head with its locking pin 28 removed, ready for connection with the cross pin. FIG. 10 illustrates how the tow bar head can be attached by placing the outside of the striker nose portion 24 in abutment with the cross pin P and moving the tow bar head forwardly so that the slide lock 17 is pushed rearwardly in its slot 21 to the position illustrated in FIG. 11, whereat said cross pin will be fully received within the transverse slot 14. The slide lock 17 will then be free to move forwardly again under the influence of helical tension spring 22, as illustrated in FIG. 12, whereupon the locking pin 27 can be inserted to prevent accidental withdrawal of the slide lock 17 and consequent inadvertent release of the aircraft strut cross pin P. Release of the tow bar is accomplished simply by withdrawing locking pin 28 and pulling back on the handle 20 to open the connector slot 14.

While I have illustrated and described herein only one form in which my invention can conveniently be embodied in practice, it is to be understood that form is presented by way of example only and not in a limiting sense. The invention, in brief, comprises all the embodiments and modifications coming within the scope and spirit of the following claims.

What we claim as new and desire to secure by Letters Patent is:

1. In a tow bar coupling head for commercial aircraft of the type equipped with a cylindrical cross pin for tow bar coupling, the combination comprising, a steel tow bar head body member, said body member being of substantially rectangular shape, means for removably joining the rearward end of said body member to a tow bar, and means for releasably interconnecting a forward end portion of said body member to an aircraft cross pin, said releasable interconnecting means comprising a transverse slot in the underside of said body member and in spaced relation with respect to said forward end of said body member, the underside of said body member further having a longitudinally-extending recess open at the forward end of said body member, and a slide lock member slidingly received within said longitudinal recess and movable between covering and uncovering positions with respect to said transverse slot for selectively locking and unlocking an aircraft towing cross pin received within said transverse slot.

2. A tow bar coupling head as defined in claim 1 including a handle attached to said slide lock member and extending upwardly through a longitudinally-extending slot in said body member for manually moving said slide lock member between said covering and uncovering positions.

3. A tow bar coupling head as defined in claim 2 including resilient means normally constraining said slide lock member in said covering position.

4. A tow bar coupling head as defined in claim 3, wherein said resiliently constraining means comprises a helical tension spring one end of which is attached with respect to a forward end portion of said body member and the other end of which is attached to an upwardly extending portion of said handle.

5. A tow bar coupling head as defined in claim 4, wherein the forward end of said slide lock member is provided with a downwardly projecting striker nose portion, the front surface of said nose portion being flush with the front end surface of said slide lock and the rear surface of said nose portion being rearwardly inclined to define a beveled striker surface.

6. A tow bar coupling head as defined in claim 5, including a flat cover plate attached to the underside of said body member for retaining said slide lock member in place within said longitudinal recess.

7. A tow bar coupling head as defined in claim 5, including a locking pin removably receivable within a vertically-extending opening in said body member, said locking pin, when in said vertically-extending opening, being operative to abut a rearward edge portion of said slide lock member when in said covering position to block movement to said uncovering position.

* * * * *